(12) United States Patent
Thyni et al.

(10) Patent No.: US 9,654,540 B2
(45) Date of Patent: May 16, 2017

(54) LOAD BALANCING AMONG NETWORK SERVERS

(75) Inventors: Tomas Thyni, Järfälla (SE); Christian Gotare, Getinge (SE); Johan Kolhi, Vaxholm (SE); Annikki Welin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 13/877,221

(22) PCT Filed: Sep. 30, 2010

(86) PCT No.: PCT/EP2010/064614
§ 371 (c)(1),
(2), (4) Date: Apr. 1, 2013

(87) PCT Pub. No.: WO2012/041386
PCT Pub. Date: Apr. 5, 2012

(65) Prior Publication Data
US 2013/0185410 A1    Jul. 18, 2013

(51) Int. Cl.
*G06F 15/16* (2006.01)
*H04L 29/08* (2006.01)
(Continued)

(52) U.S. Cl.
CPC ........ *H04L 67/00* (2013.01); *H04L 29/12358* (2013.01); *H04L 29/12415* (2013.01);
(Continued)

(58) Field of Classification Search
CPC ..... H04L 67/10; H04L 67/00; H04L 61/2528; H04L 61/2514; H04L 29/12915; H04L 61/2517; H04L 61/251
(Continued)

(56) References Cited

U.S. PATENT DOCUMENTS

| 6,650,621 B1 * | 11/2003 | Maki-Kullas ............... 370/238 |
| 2002/0021703 A1 * | 2/2002 | Tsuchiya et al. ............ 370/401 |

(Continued)

FOREIGN PATENT DOCUMENTS

| CN | 101340327 A | 1/2009 |
| GB | 2 440 436 A | 1/2008 |

OTHER PUBLICATIONS

Observations of IPv6 traffic on a 6to4 relay,ACM SIGCOMM Computer Communication Review Homepage archive,vol. 35 Issue 1, Jan. 2005.*
(Continued)

*Primary Examiner* — Melvin H Pollack
*Assistant Examiner* — Messeret f Gebre (57) ABSTRACT

Apparatus for performing load balancing among network servers connected to an internal IPv6 network. The apparatus comprises a first interface coupled to an external IPv4 or IPv6 network for receiving packets sent across the external network and an IP packet creator coupled to said first interface. This IP packet creator is configured, for each received packet at that interface, to select a network server to be allocated to the packet or identify an already allocated network server. The IP packet creator is further configured to create a corresponding IPv6 packet for transmission over said internal network to the selected or identified network server. The apparatus further comprises a second interface coupled to said internal IPv6 network for transmitting created IPv6 packets across the internal network towards respective selected or identified network servers.

21 Claims, 5 Drawing Sheets

(51) Int. Cl.
*H04L 29/12* (2006.01)
*H04L 29/06* (2006.01)

(52) U.S. Cl.
CPC ........ *H04L 61/251* (2013.01); *H04L 61/2532* (2013.01); *H04L 67/1002* (2013.01); *H04L 69/22* (2013.01)

(58) Field of Classification Search
USPC ....................................................... 709/223
See application file for complete search history.

(56) References Cited

U.S. PATENT DOCUMENTS

| | | | |
|---|---|---|---|
| 2003/0093560 A1* | 5/2003 | Ono et al. ..................... | 709/244 |
| 2005/0008032 A1* | 1/2005 | Yamamoto et al. .......... | 370/466 |
| 2005/0068981 A1 | 3/2005 | Park et al. | |
| 2006/0140213 A1 | 6/2006 | Hwang et al. | |
| 2006/0227792 A1* | 10/2006 | Wetterwald ....... | H04L 29/12358 370/395.52 |
| 2011/0110375 A1* | 5/2011 | Boucadair et al. ........... | 370/393 |

OTHER PUBLICATIONS

V. K. Gondi, Q. T. Nguyen-Vuong and N. Agoulmine, "A New Mobility Solution Based on PMIP Using AAA Mobility Extensions in Heterogeneous Networks," NOMS Workshops 2008—IEEE Network Operations and Management Symposium Workshops, Salvador da Bahia, 2008.*

IP multimedia services: analysis of mobile IP and SIP interactions in 3G networks Faccin, S. M.; Lalwaney, P.; Patil, B.. IEEE Communications Magazine 42.1 (Jan. 2004).*

Y. Kawarasaki, T. Shibata and T. Takahashi, "IPv4/IPv6 SIP interworking methods in dual-stack network," 9th Asia-Pacific Conference on Communications (IEEE Cat. No.03EX732), 2003.*

Huitema. Teredo: Tunneling IPv6 over UDP through NATs. Draft-ietf-ngtrans-shipworm-06.txt. Internet Engineering Task Force, vol. ngtrans, No. 6. Feb. 19, 2002.

* cited by examiner

LOAD BALANCING AMONG NETWORK SERVERS

TECHNICAL FIELD

The present invention relates to a method and apparatus for achieving load balancing among network servers. Such network servers may be web servers connected to an internal IPv6 network, the internal network being connected in turn to an external IPv4 or IPv6 network.

BACKGROUND

Load balancing is a technique used to distribute traffic efficiently among network servers performing the same or similar functions so that no individual server is overburdened and the network performance is able to cope in the case of sudden fluctuations in traffic activity. Load balancing may be employed for example to handle HTTP requests for a particular website. If there is only one web server responding to all the incoming HTTP requests for the website, the capacity of the web server may not be able to handle high volumes of incoming traffic once the website becomes popular. The website's pages will load slowly and some of the users will have to wait until the web server is free in order for their requests to be processed. In order to achieve web server scalability, more servers can be added to distribute the load among the group of servers. Such a group of servers is sometimes referred to as a "server cluster". Load balancing can be applied to many different types of servers (including application servers and database servers).

Current load balancing solutions are based on network servers that are connected to an internal network, typically an IPv4 network. The internal network is in turn connected to some load balancing equipment which is in turn connected, directly or indirectly to an external network (again, the external network is typically an IPv4 network). The external network may be a public network, such as the Internet, or a private network such as the backbone network of a telecommunications service provider.

Load balancing may be executed on the application layer, where a session once established is maintained at the same cluster server. Deep Packet Inspection (DPI) of packet headers is performed by the load balancing equipment (or associated DPI equipment). For example, when an HTTP request arrives to the server load balancer, the packet is inspected using DPI and the destination IP and port number re-written before forwarding the packet to the allocated cluster server.

The disadvantages of this known approach to load balancing include:
  There is no common load balancing system between IPv4 and IPv6, i.e. different approaches are employed depending upon whether the external network is IPv4 or IPv6;
  Where both the external and internal networks are IPv4, the IPv4 to IPv4 network address translation requires state binding at IP and TCP/UDP port level.

An alternative approach to load balancing is to rely upon a Domain Name System (DNS) server which maintains a set of IP addresses corresponding to respective servers of a cluster. When a client request the IP address from the DNS, e.g. for an HTTP request, the DNS server sends a DNS response using the a public IP address from the set of IP addresses stored in the DNS record. The DNS server selects one of the cluster server IP addresses, e.g. on a round robin basis, and returns this to the client. The client sends the HTTP request on to the server network using the selected IP address as destination address.

SUMMARY

It is an object of the present invention which simplifies the handling of IP packet headers at a load balancing server, and in particular reduces the computational overhead for such handling. It is a also an object of the present invention to provide a method and apparatus for handling incoming packets at a load balancing server and which minimises the need to map and/or translate data into the packet headers.

According to a first aspect of the present invention there is provided apparatus for performing load balancing among network servers connected to an internal IPv6 network. The apparatus comprises a first interface coupled to an external IPv4 or IPv6 network for receiving packets sent across the external network and an IP packet creator coupled to said first interface. This IP packet creator is configured, for each received packet at that interface, to select a network server to be allocated to the packet or identify an already allocated network server. The IP packet creator is further configured to create a corresponding IPv6 packet for transmission over said internal network to the selected or identified network server, including performing the following tasks:
  (a) include the source IP address of the received packet in the source IP address field of the IPv6 packet header,
  (b) include at least a part of the destination IP address field of the received packet in the destination IP address field of the IPv6 packet header, and
  (c) include an address of the selected or identified network server into the destination IP address field of the IPv6 packet header, The apparatus further comprises a second interface coupled to said internal IPv6 network for transmitting created IPv6 packets across the internal network towards respective selected or identified network servers.

In the case where the external network is an IPv6 network, the task of the IP packet creator is relatively simple. It merely needs to rewrite certain bits (e.g. the least significant 16 bits) of the IPv6 destination address with the address of the selected or identified network server. In the case where the external network is an IPv4 network, although certain bits must be inserted into the IPv4 header, to generate an IPv6 header, the process remains computationally efficient, compared for example with the prior art requirement for Deep Packet Inspection.

According to a second aspect of the present invention there is provided a method of performing load balancing among network servers connected to an internal IPv6 network. The method comprises receiving packets sent across an external IPv4 or IPv6 network and, for each received packet, selecting a network server to be allocated to the packet or identifying an already allocated network server. A corresponding IPv6 packet for transmission over said internal network to the selected or identified network server is created by performing the following steps:
  (a) including the source IP address of the received packet in the source IP address field of the IPv6 packet header,
  (b) including at least a part of the destination IP address field of the received packet in the destination IP address field of the IPv6 packet header, and
  (c) including an address of the selected or identified network server into the destination IP address field of the IPv6 packet header.

Created IPv6 packets are then transmitted across the internal network towards respective selected or identified network servers.

DETAILED DESCRIPTION

An approach to load balancing is presented here which relies upon use of IPv6 addresses within the internal network to which a group of network servers (a server "cluster") are connected. The IPv6 address space is clearly very large and this fact is taken advantage of to allow internal IPv6 addresses to convey information over and above that required to merely route packets across the network. In the following, it is assumed that these servers are web servers, although the approach is equally applicable to other network server types including database servers, file servers, etc.

Figure 1:
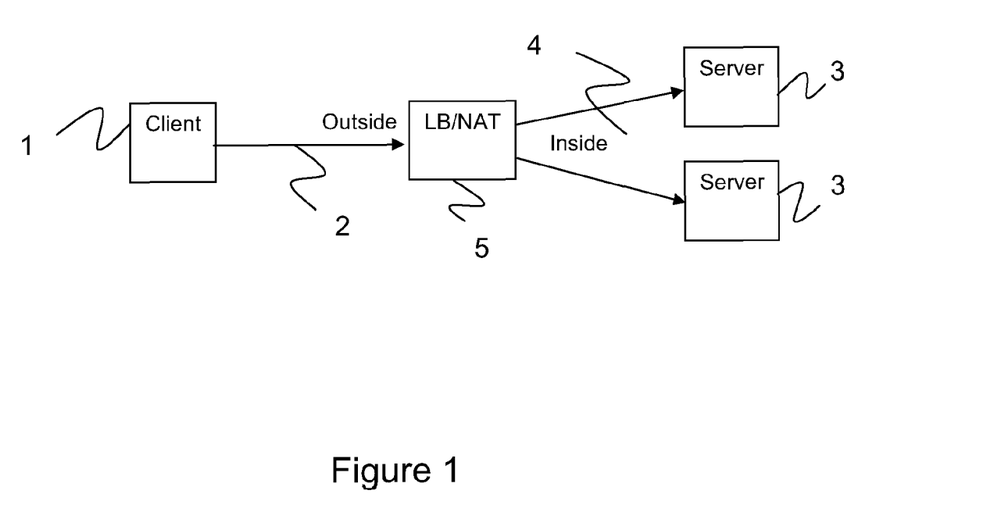
FIG. 1 illustrates schematically a simple load balancing scenario in which traffic from clients is load balanced across a set or cluster of network servers.

Consider firstly the case illustrated in FIG. 1, where clients 1 attached to an external IPv4 network 2 seek to access a service provided by a web service provider. The service provider maintains a cluster of web servers 3 hosting the same or similar services, and which are connected to an internal IPv6 network 4. This might be merely an informational service, e.g. an online newspaper, an online banking service, etc. The internal and external networks are interconnected by a load balancing server 5 (or possibly a switch or router) which comprises a Network Address Translator (NAT). The NAT may form part of a firewall.

Figure 2:
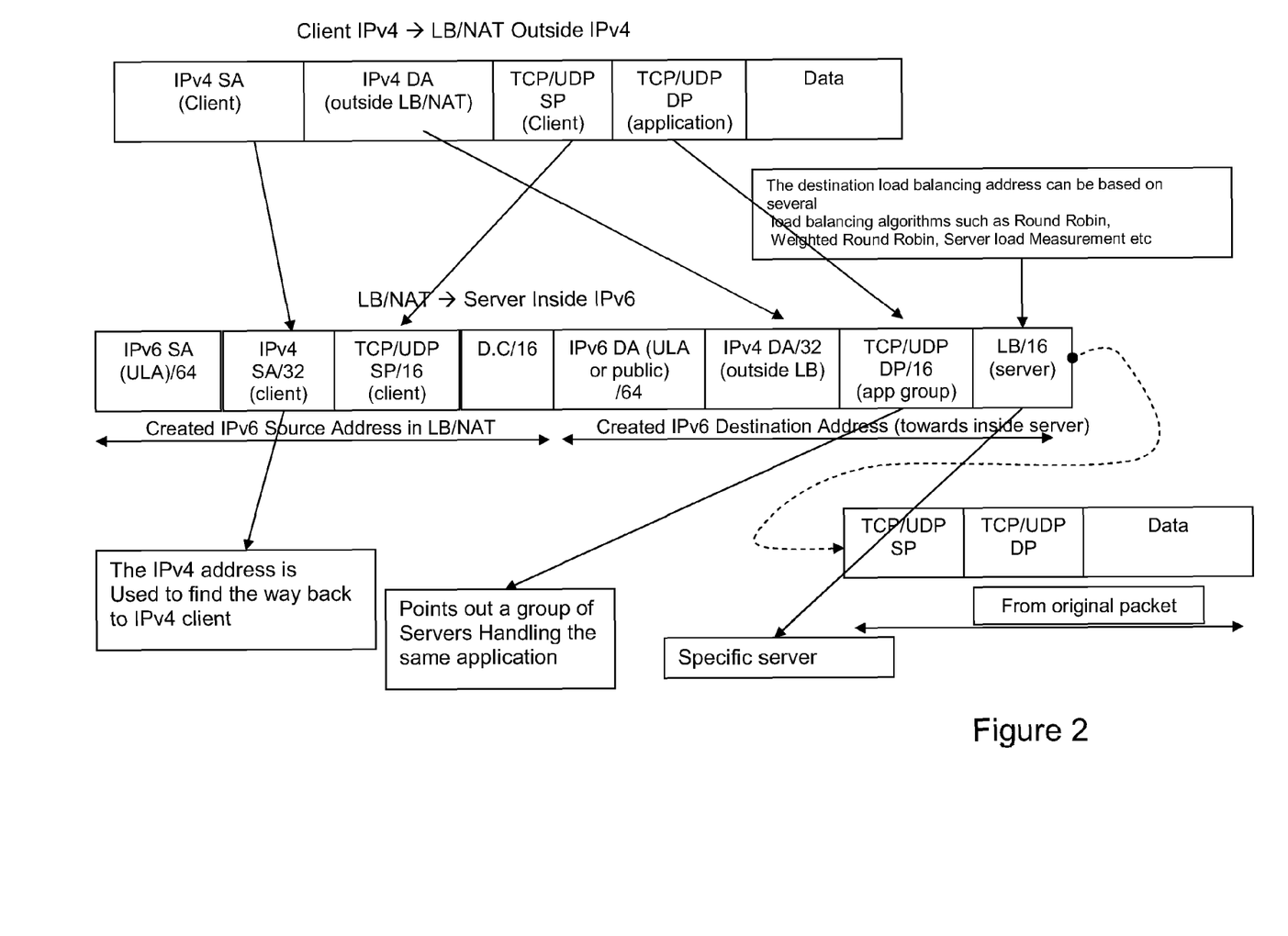
FIG. 2 illustrates schematically a process for transforming an IPv4 header into an IPv6 header taking into account a load balancing selection.

In the first instance, a client is likely to send an HTTP request to the load balancing server via the external network using a public IPv4 address of that server as the destination address (DA). The client includes its own IPv4 address as the source address (SA) in the packet, as well as source port (SP) and destination port (DP) numbers. The IPv4 packet structure is illustrated in the upper part of FIG. 2, denoted "Client IPv4→LB/NAT Outside IPv4". Rather than performing Deep Packet Inspection (DPI) on the packet, the load balancing server 5 uses the IPv4 packet header data to construct an IPv6 packet header for internal use. This process is illustrated in the lower part of FIG. 2, where the constructed IPv6 packet is denoted "LB/NAT→Server Inside IPv6". Arrows in FIG. 2 are used to denote the mapping of parts of the IPv4 header into the IPv6 header. The IPv6 header comprises the following components:

| Field no. | Field content | Explanation |
| --- | --- | --- |
| 1. | IPv6 SA (ULA)/64: | A 64 bit unique local address (ULA) of the network. This field is the same for all messages. |
| 2. | IPv4 SA/32 (client) | The client 32 bit IPv4 address included as source address in the HTTP request. |
| 3. | TCP/UDP SP/16 (client) | The 16 bit TCP/UDP source port included in the HTTP request. |
| 4. | D.C/16 | Don't Care (DC) bits, i.e. of no importance. The IPv6 SA/64 part (1) is used as the indication of the load balancing server, meaning that any additional addresses below the first/64 are considered to be the NAT as well. |
| 5. | IPv6 DA (ULA)/64 | A 64 bit unique local address (ULA) of the network. This field is the same for all messages. |
| 6. | IPv4 DA/32 (outside LB) | The 32 bit IPv4 address included as destination address in the HTTP request, i.e. the external IPv4 address of the load balancing server. |
| 7. | TCP/UDP DP/16 (app group) | The 16 bit TCP/UDP destination port included in the HTTP request (bits 96 to 111). |
| 8. | LB/16 (server) | A 16 bit load balancing (LB) address (bits 112 to 127) |
| 9. | TCP/UDP SP | The 16 bit TCP/UDP source port included in the HTTP request. |
| 10. | TCP/UDP DP | The 16 bit TCP/UDP destination port included in the HTTP request. |
| 11. | Data | The payload copied from the HTTP request |

Routers within the internal IPv6 network are configured to route packets based on the IPv6 address, and essentially based upon the last 32 bits of the destination address, and ultimately based on the last 16 bits of the destination IPv6 address for the specific application in question. In the case of packets sent into the network from the load balancing server, this will be the 16 LB bits. These are used to identify the destination web server, allowing up to 65536 individual or virtual servers to be separately addressed. When a request is received by the load balancing server, the server will first check to see if this request is associated with an existing session. The server retains state information for this purpose. Assuming however that there is no associated ongoing session, the server will perform a load balancing operation to identify a suitable web server to which the request will be forwarded. Load balancing may be achieved using a simple round robin selection, a weighted round robin selection, based upon measured loads, etc. This web server is associated with a particular set of LB bits. The load balancing server then constructs the IPv6 packet as illustrated in FIG. 2, inserting the chosen set of LB bits, and forwards the packet into the internal network.

The load balancing server 5 is able to construct the IPv6 packet of FIG. 2 merely by inserting into the received IPv4 packet fields 1, 3, 4, 5, 7 and 8. Computationally, this is a relatively straightforward procedure for the load balancing server to perform.

In the case that several different applications are being handled inside the server cluster, it will be appreciated that the TCP/UDP DP/16 that precedes the LB bits in the IPv6 header can be used to point to a group of servers handling the same application, e.g. port 80 (http) in one group, port 110 (email pop3) in an other group and so on. Of course, the IPv6 header can point to a virtualized server, and not just to real servers.

Figure 3:
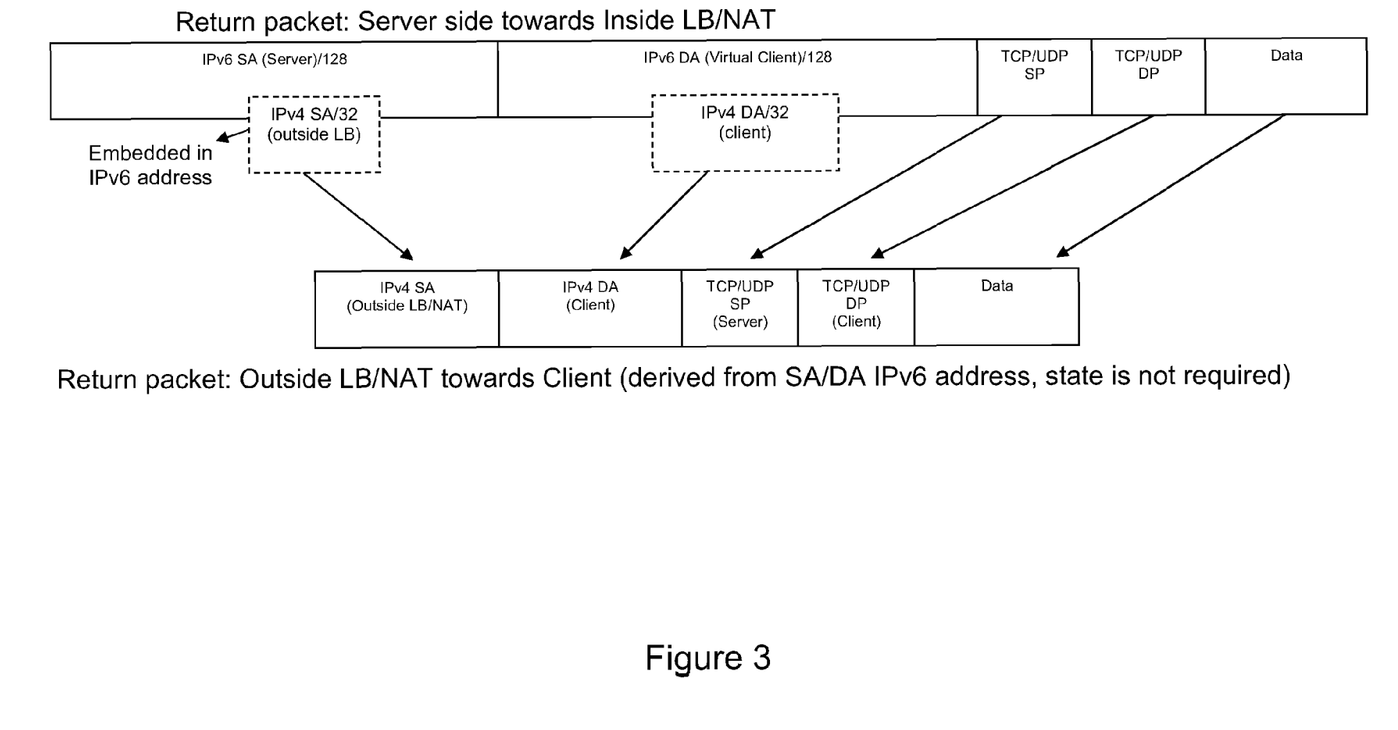
FIG. 3 illustrates schematically a process for transforming a response packet, received from a load balancing server, from an IPv6 format to an IPv4 format.

Following receipt of a packet, the selected web server processes the request and begins forwarding a stream of packets towards the source address and port identified in the request, i.e. effectively reversing the source and destination header parts of the received request. Upon receipt of each response packet, the load balancing server constructs an IPv4 external packet by removing various parts of the IPv6 header. In particular, the server removes all parts of the IPv6 internal header with the exception of the IPv4 SA/32 (outside LB), the IPv4 DA/32 (client), the TCP/UDP SP, and the TCP/UDP DP components, as illustrated in FIG. 3. The response packets are then forwarded over the external IPv4 network to the requesting client using the original TCP/UDP port numbers. Again, as with the handling of packets arriving at the load balancing server from the external network, this handling of packets arriving from the internal network can be achieved in a very computationally efficient manner.

As mentioned above, the load balancing server maintains state information in order to allow subsequent packets, received at the load balancing server from the same client, to be associated with the already allocated server. This state information comprises the created IPv6 source and destination addresses generated by the load balancing server. The load balancing server recognises packets on the basis of the source and destination IP addresses and port numbers.

A similar approach can be used to handle packets received at the load balancing server and where IPv6 is used as the addressing protocol in the external network. In this case, fields 1. to 4. of the created IPv6 address header (identified above) are filled with the IPv6 source address of a received packet, whilst fields 5. and 6. are filled with the 64 least significant bits of the IPv6 destination address of the received packet. Fields 7 and 8 are again filled with the TCP/UDP DP/16 and the selected LB/16 corresponding to the selected web server. In practice, this process is achieved merely by overwriting the final 32 bits of the IPv6 destination address of the incoming IPv6 packet with the TCP/UDP destination port (of the incoming packet) and the 16 bit load balancing address.

When a web server replies to the load balancing server using the received source address as destination address, the reply packets will be routed to the load balancing server as it is responsible for all unallocated IPv6 addresses within the internal network. The load balancing server need only overwrite the final 32 bits of the internal IPv6 source address with the corresponding bits of the external IPv6 address of the load balancing server, before sending the packet out over the external IPv6 network.

Figure 4:
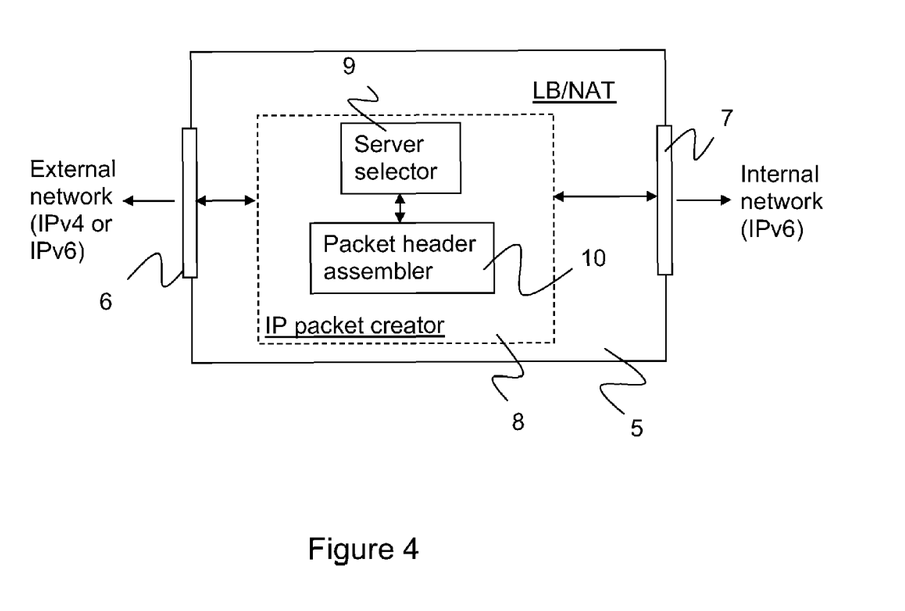
FIG. 4 illustrates schematically a load balancing server configured to implement the process of FIG. 2.

FIG. 4 illustrates various components of a load balancing server 5 required to implement the functionality described above. The server 5 comprises a first network interface 6 coupled to the external network (e.g. the Internet), and a second network interface 7 coupled to the internal network (e.g. a LAN or WAN). The server comprises memory and processing elements configured to implement an IP packet creator 8 which in turn implements a server selector 9 and a packet header assembler 10. The server selector 9 reacts to a packet received on the first interface 6 by selecting or identifying a server within the internal network. It then provides an address (LB/16) of the selected or identified server to the packet header assembler 10. The role of the packet assembler is to assemble an IPv6 packet (header) incorporating the received address into the destination IP address field (as detailed in the above table and as illustrated in FIG. 2), and send these out via the second interface 7. The packet header assembler also handles packets received on the second interface 7, constructs as required IPv4 or IPv6 headers, and sends these out via the first interface 6 (as illustrated in FIG. 3).

Figure 5:
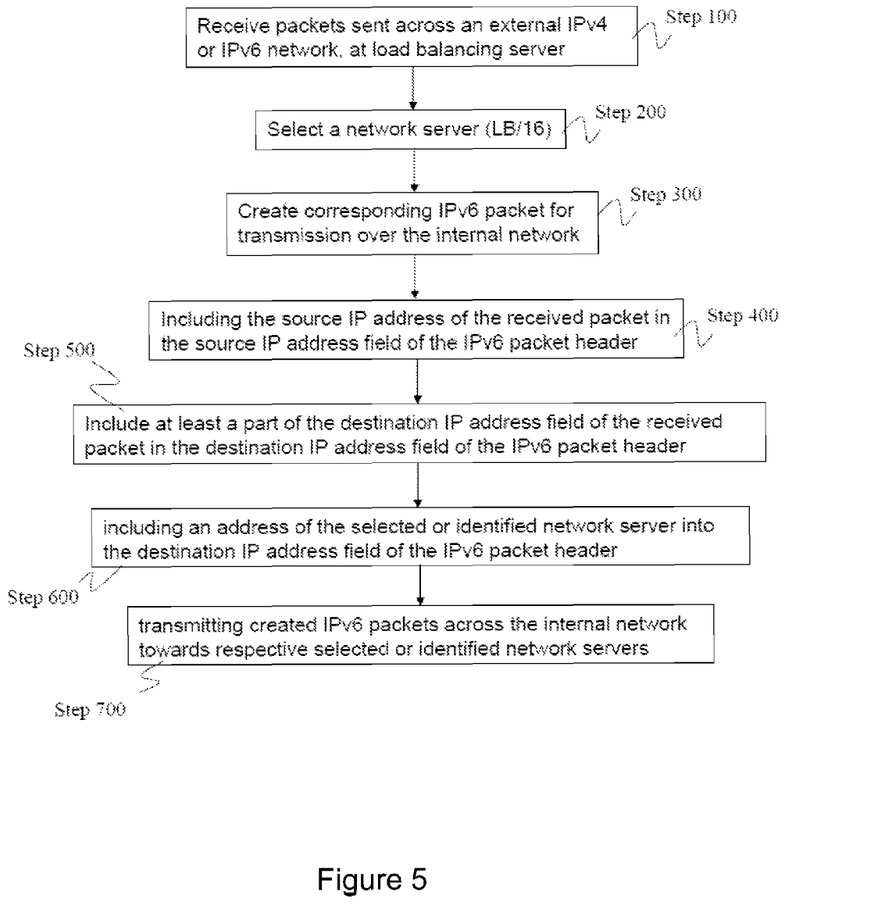
FIG. 5 is a flow diagram further illustrating the process of FIG. 2.

FIG. 5 is a flow diagram further illustrating the method of handling packets (either IPv4 or IPv6) received at the load balancing server from the external network, step 100. At step 200, the server either selects a network server or identifies an already allocated server based upon state data. At step 300, the load balancing server initiates a process for creating an IPv6 packet for transmission over the internal network. This process includes, at step 400, the inclusion of the IP source address, of the received packet, into the source IP address field of the IPv6 packet being created. Similarly, at step 500, all or part of the destination address of the received packet is included in the destination IP address filed of the IPv6 packet. At step 600, the address of the selected network server is inserted into the destination address field. The constructed IPv6 packet, including the network server address component, is sent out over the appropriate interface to the internal network, step 700.

According to the approach presented here, the load balancing server does not need to re-write the whole packet header, either for packets arriving from the external network or for packets arriving from the internal network, due the effective redundancy within the IPv6 addresses space. Port address translations are not required at all.

It will be appreciated by the person of skill in the art that various modifications may be made to the above described embodiments without departing from the scope of the present invention. For example, it will be appreciated that the IPv4 and IPv6 packet headers will include certain fields in addition to those shown in FIGS. 2 and 3—these are omitted from the figures for the sake of clarity.

The invention claimed is:

1. An server apparatus for performing load balancing among network servers connected to an internal IPv6 network, the apparatus comprising:
   a processor;
   a memory;
   a first network interface coupled to an external IPv6 network for receiving packets from the external network; and
   an IP packet assembler configured to receive each packet, and for each received packet,
      to select a network server to be allocated to the packet or identify an already allocated network server,
      to create a corresponding IPv6 packet for transmission over said internal network to the selected or identified network server, the IP packet assembler being configured to include:
         the source IP address of the received packet in the source IP address field of the IPv6 packet header,
         at least a part of the destination IP address field of the received packet in one part of the destination IP address field of the IPv6 packet header, and
         an address of the selected or identified network server in a second part of the destination IP address field of the IPv6 packet header,
   the apparatus further comprising a second network interface coupled to said internal IPv6 network for transmitting created IPv6 packets across the internal network towards respective selected or identified network servers.

2. The server apparatus according to claim 1, wherein said network server address is a 16 bit address and this address is included as bits 112 to 127 of the destination IP address field of the IPv6 packet header.

3. The server apparatus according to claim 1, wherein said IP packet assembler is configured to include a destination port number of the received packet into the destination IP address field of the IPv6 packet header.

4. The server apparatus according to claim 3, wherein said destination port number is included as bits 96 to 111 of the destination IP address field of the IPv6 packet header.

5. The server apparatus according to claim 1, wherein, where said external network is an IPv6 network, said IP packet assembler is configured to create said corresponding IPv6 packet by overwriting a part of the destination IP address field of the received IPv6 packet header with the address of the selected or identified network server.

6. The server apparatus according to claim 1, wherein, where said external network is an IPv4 network, said IP packet assembler is configured to create said corresponding IPv6 packet header by inserting into the header data of the IPv4 packet:
 an IPv6/64 source address of the internal network, in front of the IPv4 source address; and
 an IPv6/64 destination address of the internal network, in front of the IPv4 destination address.

7. The server apparatus according to claim 6, said IP packet assembler being further configured to insert into the IPv4 packet header data:
 a source port number of the received packet, after the IPv4 source address; and
 a destination port number of the received packet, after the IPv4 destination address.

8. The server apparatus according to claim 7, said IP packet assembler being further configured to insert said address of the selected or identified network server into the IPv4 packet header data, after said inserted destination port number.

9. The server apparatus according to claim 6, said IP packet assembler being configured to insert a set of 16 padding bits into the header after said inserted source port number.

10. The server apparatus according to claim 1, wherein said IP packet assembler maintains the source and destination port number fields of the received packet header unchanged when creating the IPv6 packet for transmission over the internal network.

11. The server apparatus according to claim 1, the apparatus being configured to operate as a Network Address Translator, NAT.

12. A method of a load balancing server for performing load balancing among network servers connected to an internal IPv6 network, the method comprising:
 receiving, at a load balancing server, packets sent from an external IPv4 or IPv6 network;
 for each received packet,
  selecting a network server to be allocated to the packet or identifying an already allocated network server;
  creating a corresponding IPv6 packet for transmission over said internal network to the selected or identified network server by:
   including the source IP address of the received packet in the source IP address field of the IPv6 packet header,
   including at least a part of the destination IP address field of the received packet in one part of the destination IP address field of the IPv6 packet header, and
   including an address of the selected or identified network server in a second part of the destination IP address field of the IPv6 packet header, the second part being the least significant bits of the destination IP address field of the IPv6 packet header; and
 transmitting the created IPv6 packets across the internal network towards the respective selected or identified network server.

13. The method according to claim 12, wherein said network server address is a 16 bit address and this address is included as bits 112 to 127 of the destination IP address field of the IPv6 packet header.

14. The method according to according to claim 12 and comprising including a destination port number of the received packet into the destination IP address field of the IPv6 packet header.

15. The method according to claim 14, wherein said destination port number is included as bits 96 to 111 of the destination IP address field of the IPv6 packet header.

16. The method according to claim 12, where said external network is an IPv6 network, the method comprises creating said corresponding IPv6 packet by overwriting a part of the destination IP address field of the received IPv6 packet header with the address of the selected or identified network server.

17. The method according claim 12, wherein, where said external network is an IPv4 network, the method comprises creating said corresponding IPv6 packet by inserting into the header data of the IPv4 packet:
 an IPv6/64 source address of the internal network, in front of the IPv4 source address; and
 an IPv6/64 destination address of the internal network, in front of the IPv4 destination address.

18. The method according to claim 17 and comprising inserting into the IPv4 packet header data:
 a source port number of the received packet, after the IPv4 source address; and
 a destination port number of the received packet, after the IPv4 destination address.

19. The method according to claim 18 and comprising inserting said address of the selected or identified network server into the IPv4 packet header data, after said inserted destination port number.

20. The method according to claim 17 and comprising inserting a set of 16 padding bits into the header data after said inserted source port number.

21. The method according to claim 12, wherein the source and destination port number fields of the received packet header are left unchanged when creating the IPv6 packet for transmission over the internal network.

* * * * *